(12) United States Patent
Seiferling et al.

(10) Patent No.: US 6,884,283 B2
(45) Date of Patent: Apr. 26, 2005

(54) PROCESS FOR REMOVING BUBBLES FROM VISCOUS POLYMER SOLUTIONS

(75) Inventors: Bernhard Seiferling, Goldbach (DE); Achim Müller, Grossostheim (DE); Iris Jlona Leder-Brück, Grossostheim (DE); Mark Hülsebusch, Bad Schwartau (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/318,622

(22) Filed: Dec. 13, 2002

(65) Prior Publication Data

US 2003/0136268 A1 Jul. 24, 2003

(30) Foreign Application Priority Data

Dec. 19, 2001 (EP) .............................. 01130186

(51) Int. Cl.$^7$ .............................................. B01D 19/00
(52) U.S. Cl. ...................... 95/241; 96/155; 528/502 C
(58) Field of Search ............................ 95/241; 96/155; 528/502 C

(56) References Cited

U.S. PATENT DOCUMENTS

| | | | | |
|---|---|---|---|---|
| 4,088,811 A | * | 5/1978 | Harris et al. ................... | 526/89 |
| 4,146,696 A | | 3/1979 | Bond et al. ................... | 526/194 |
| 4,652,596 A | * | 3/1987 | Williams et al. ............ | 523/348 |
| 4,681,718 A | * | 7/1987 | Oldham ....................... | 264/102 |
| 6,364,934 B1 | * | 4/2002 | Nandu et al. ................... | 95/46 |

FOREIGN PATENT DOCUMENTS

DE            25 50 236          5/1977

* cited by examiner

*Primary Examiner*—Duane Smith
*Assistant Examiner*—Douglas J. Theisen
(74) *Attorney, Agent, or Firm*—Karen A. Borrelli; Robert Gorman; R. Scott Meece

(57) ABSTRACT

In a process for removing bubbles from viscous polymer solutions (P) in which the content of dissolved gases lies below the saturation limit, the viscous polymer solution (P) is subjected to a superatmospheric pressure. The superatmospheric pressure is such that the gases contained in the bubbles of the polymer solution (P) dissolve.

7 Claims, 1 Drawing Sheet

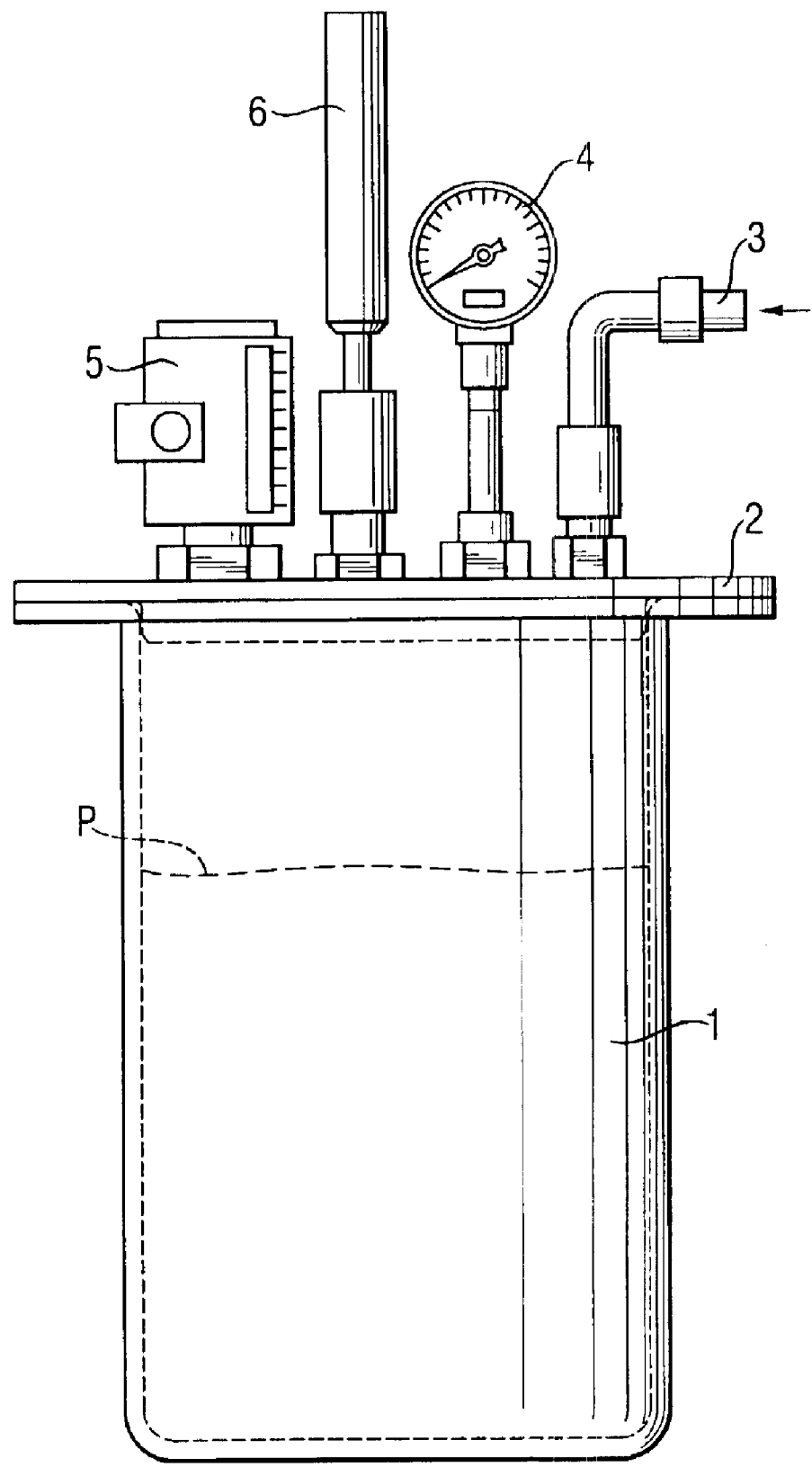

PROCESS FOR REMOVING BUBBLES FROM VISCOUS POLYMER SOLUTIONS

This application claims under 35 U.S.C. §119(a)–(d) or §365(b) of European patent Application No. 01130186.8 filed Dec. 19, 2001.

The invention relates to a process for removing bubbles from viscous polymer solutions.

Viscous polymer solutions are used, for example, as starting material in the production of contact lenses. These can, for example, be polymer solutions based on polyvinyl alcohol, as are described in EP-A-641806. During storage, such polymer solutions may show a tendency to increased viscosity and to gelation, but gelated starting material is unsuitable for the production of contact lenses. For conditioning purposes, the polymer solution is therefore heated and stirred, by which means gelated starting material is converted back to viscous polymer solution and further gelation of the starting material is counteracted. However, as a result of the stirring, it is also possible for (gas) bubbles, for example air bubbles in an atmospheric environment, to get into the polymer solution. Bubbles can also form in the polymer solution when said polymer solution is transferred from large storage containers into containers such as are used in the production of contact lenses.

Whereas large bubbles can rise rapidly and escape from the polymer solution, small bubbles do this only slowly, because of the viscosity of the polymer solution. These small bubbles therefore remain in the polymer solution which is used as starting material for the contact lenses, the latter then typically being produced in a casting process. However, the small bubbles are critical because these small bubbles are then also present in the finished contact lens, enclosed within the material of the contact lens. The optical quality of a contact lens must be absolutely perfect before it can be released, however, and for this reason bubbles cannot be tolerated. If a contact lens does have such bubbles, it is rejected during quality control of the contact lenses.

The object of the present invention is to provide a process by which any bubbles present in the polymer solution, in particular small bubbles, can be removed from said polymer solution, and consequently to reduce the amount of rejected material occasioned by these bubbles in the production of contact lenses.

This object is achieved by the process according to the invention, as characterized by the features of the independent patent claim. Particularly advantageous variants of the process according to the invention will become evident from the features of the dependent patent claims.

In particular, the viscous polymer solution is subjected to a superatmospheric pressure which is such that the gases contained in the bubbles of the polymer solution dissolve. A precondition for this, however, is that the content of dissolved gases in the polymer solution lies below the saturation limit, in other words the polymer solution must be able to take up more gases into solution, namely the gases contained in the bubbles. The gases contained in the bubbles are dissolved in this way and, as a result, are also no longer present in the contact lenses.

In an advantageous variant of the process according to the invention, the superatmospheric pressure is reduced again to ambient pressure after the gases contained in the bubbles have dissolved, which ambient pressure can in particular be atmospheric pressure. This is advantageous especially for the conventional casting processes for contact lenses, in which the contact lenses are produced at atmospheric pressure as the ambient pressure.

There are various possibilities for applying the superatmospheric pressure. Thus, in one variant of the process according to the invention, the viscous polymer solution can be subjected to a mechanically generated superatmospheric pressure, for example the superatmospheric pressure can be applied with the aid of a plunger which mechanically subjects the polymer solution to pressure. This variant has the advantage that there is no danger of the polymer solution taking up gas from the surrounding atmosphere, because, in the case of the plunger, the pressure face of the plunger bears directly on the surface of the polymer solution.

In another variant of the process, the viscous polymer solution is subjected to a superatmospheric pressure generated by gas pressure. This variant is less costly because no plunger is required, and a superatmospheric gas pressure can instead be built up inside a container, the result being that the gases contained in the bubbles dissolve.

In this variant, it can be advantageous if the gas or gas mixture used to generate the superatmospheric pressure is substantially insoluble in the polymer solution.

For example, this gas could possibly be helium, or another gas which is substantially insoluble. If such insoluble gases are used to generate the superatmospheric pressure, there is no danger that, on account of the saturation limit of the polymer solution being increased by the superatmospheric pressure, the gas used to generate the superatmospheric pressure, or components of the gas mixture, will be dissolved in the polymer solution, which gas or gas components, after subsequent reduction of the superatmospheric pressure, would have to escape from the solution or form bubbles, because the saturation limit drops again upon reduction of the superatmospheric pressure.

To generate the superatmospheric pressure, it is also possible, however, to use a gas mixture comprising components which are soluble in the polymer solution. In this case, however, the components of the gas mixture which are soluble in the polymer solution are preferably present only in a certain proportion, the latter being such that the partial pressure of the soluble components of the gas mixture at the respectively applied superatmospheric pressure is only so great that it corresponds at maximum to the partial pressure of the soluble components at ambient pressure. In this way, it is ensured that in no circumstances during the superatmospheric pressure phase is a quantity of soluble components taken up in the polymer solution which exceeds the saturation limit of the polymer solution at ambient pressure.

In a further, simple variant, nitrogen (or air) is used to generate the superatmospheric pressure. Nitrogen (or air) can be very easily made available. This surprisingly very efficient variant is based on the fact that the speed of the gas uptake of the liquid phase (polymer solution) can be controlled by the apparatus geometry via the size of the interface between polymer solution and nitrogen (or air) and is limited from the outset on account of the viscosity of the solution. A (gas) saturation of the polymer solution can therefore only be reached, if at all, near the interface between polymer solution and nitrogen (or air).

BRIEF DESCRIPTION OF THE DRAWING

Further advantageous aspects of the process according to the invention will become evident from the following description of an illustrative embodiment of the process according to the invention, with reference to the drawing. The single FIGURE in the drawing shows an illustrative embodiment of a pressure vessel in which the process according to the invention can be carried out.

The pressure vessel 1 (e.g. a stainless steel vessel) is provided with a lid 2 with which the interior of the vessel 1 can be closed off in a pressure-tight manner. A pressure attachment 3 is also provided through which a gas or gas mixture is delivered in order to generate a superatmospheric pressure in the interior of the vessel 1. A manometer 4 is also shown which indicates the pressure in the interior of the vessel 1. Finally, the FIGURE also shows a level indicator 5 and a pressure relief valve 6.

The vessel 1 contains a viscous polymer solution P (indicated by a dashed line), for example based on polyvinyl alcohol. In explaining the process according to the invention, it is assumed that this polymer solution P comprises small air bubbles which, because of the viscosity of the polymer solution P, do not escape from the solution. The content of dissolved gases in this polymer solution P lies below the saturation limit, that is to say the polymer solution P can in principle take up more gases into solution. At the start of the process, the pressure in the interior of the vessel is atmospheric pressure.

To remove the bubbles from the polymer solution P, a gas or gas mixture is now introduced into the interior of the vessel 1 via the pressure attachment, and the polymer solution P is subjected to a superatmospheric pressure, which in this case is generated by the gas or gas mixture introduced into the interior. The manometer 4 in this case indicates the pressure prevailing in the interior of the vessel 1. The gas used is preferably nitrogen, although it is also possible to use a gas (or gas mixture) which is substantially insoluble in the polymer solution, for example helium.

By means of the superatmospheric pressure in the interior of the vessel 1, the bubbles contained in the polymer solution P are removed as a result of the bubbles being broken up by the pressure and as a result of the gases contained in the bubbles being dissolved in the polymer solution. If a gas (or gas mixture) used to generate the superatmospheric pressure is substantially insoluble in the polymer solution P, it cannot dissolve in the polymer solution P, although in principle the saturation limit of the polymer solution P is increased in the superatmospheric pressure phase and this would be made possible, in the superatmospheric pressure phase, by the "receptivity" of the polymer solution P.

After the polymer solution P has been subjected to superatmospheric pressure, and therefore after the resulting dissolution of the bubbles, the superatmospheric pressure in the interior of the vessel 1 is again reduced to ambient pressure, in this case atmospheric pressure. For this purpose, the pressure relief valve 6 can be opened, for example, so that the superatmospheric pressure can escape. In this case, the gas or gas mixture used to generate the superatmospheric pressure can be collected. To ensure that the gases which were contained in the bubbles, and which have passed into solution in the polymer solution P in the superatmospheric pressure phase, also remain in solution after reduction of the pressure in the interior of the vessel 1, the content of dissolved gases in the polymer solution P must lie below the saturation limit before the superatmospheric pressure is applied, so that the gases released during dissolution of the bubbles can in fact also pass into solution in the polymer solution P (the polymer solution P must therefore still have a certain "receptivity" for those gases and must not already be saturated).

The difference between the maximum solubility (saturation limit) and the actual concentration of dissolved gases in the polymer solution tells the skilled person how much gas can be dissolved in the polymer solution, by application of pressure, without new gas bubbles forming through oversaturation when the pressure is returned to normal pressure. The size and number of the gas bubbles present in the solution before the pressure is applied determine the total volume to be dissolved. However, as this is not so easy to determine in practice, the concentration of dissolved gases actually contained in the polymer solution can also be determined before and after the application of pressure.

It is also possible in principle to generate the superatmospheric pressure using a gas mixture comprising components which are soluble in the polymer solution. In this case, it is preferable to ensure that the soluble components are present in the gas mixture only in a certain proportion, the latter being such that the partial pressure of the soluble components of the gas mixture is reduced at superatmospheric pressure such that it corresponds at maximum to the partial pressure of the soluble components at ambient pressure, in this case atmospheric pressure. This means, for example, that if the pressure is increased by a factor of five, the proportion of the components of the gas mixture which are soluble in the polymer solution P is reduced so that the corresponding partial pressure of the soluble components in the superatmospheric pressure phase is reduced by at least this factor of five and thus corresponds at maximum to the partial pressure of the soluble components at ambient pressure, in this case atmospheric pressure.

In this way, it is ensured that, in the superatmospheric pressure phase in which the saturation limit of the polymer solution P is increased, gases do not dissolve in the polymer solution P in a quantity which, upon subsequent reduction of the pressure to the ambient pressure (in this case atmospheric pressure) and the corresponding lowering of the saturation limit, cannot then remain dissolved in the polymer solution, because this amount dissolved at superatmospheric pressure lies above the saturation limit at ambient pressure (in this case atmospheric pressure).

EXAMPLE

A quantity of ca. 10 litres of a polymer solution based on polyvinyl alcohol is introduced at atmospheric pressure into a pressure vessel with a volume of ca. 12 litres. The polymer solution based on polyvinyl alcohol is Nelfilcon A.

The vessel is closed off with the lid, and a superatmospheric pressure of ca. 4 bar is generated in the interior of the vessel, the polymer solution being subjected to this pressure. The superatmospheric pressure is generated by means of gas pressure, the gas used being nitrogen. The polymer solution is subjected to the superatmospheric pressure for a period of ca. 4 hours. The pressure in the vessel is then reduced again to atmospheric pressure.

The polymer solution thus treated is substantially free of bubbles.

What is claimed is:

1. A process for removing bubbles from a viscous polymer solution, comprising a step of subjecting the viscous polymer solution to a superatmospheric pressure at which gases contained in the bubbles are dissolved in the viscous polymer solution so as to remove the bubbles from the viscous polymer solution, wherein the superatmospheric pressure is generated by gas pressure.

2. A process according to claim 1, further comprising reducing the superatmospheric pressure to ambient pressure after the gases contained in the bubbles have dissolved.

3. A process according to claim 1, wherein the superatmospheric pressure is generated by using a gas or a gas mixture which is substantially insoluble in the polymer solution.

4. A process according to claim 1, wherein the superatmospheric pressure is generated using a gas mixture comprising soluble components which are soluble in the polymer solution, but only in a proportion which is such that partial pressure of the soluble components in the gas mixture is reduced at superatmospheric pressure such that the reduced partial pressure of the soluble components in the gas mixture corresponds at maximum to the partial pressure of the soluble components at ambient pressure.

5. A process according to claim 1, wherein nitrogen or air is used to generate the superatmospheric pressure.

6. A process for removing bubbles from a viscous polymer solution, comprising a step of subjecting the viscous polymer solution to a superatmospheric pressure at which gases contained in the bubbles are dissolved in the viscous polymer solution so as to remove the bubbles from the viscous polymer solution, wherein the superatmospheric pressure is generated mechanically with a plunger.

7. A process according to claim 6, further comprising reducing the superatmospheric pressure to ambient pressure after the gases contained in the bubbles have dissolved.

* * * * *